Oct. 31, 1967  L. BRADT ET AL  3,349,718
MATERIAL HANDLING APPARATUS
Filed March 10, 1965  2 Sheets-Sheet 2

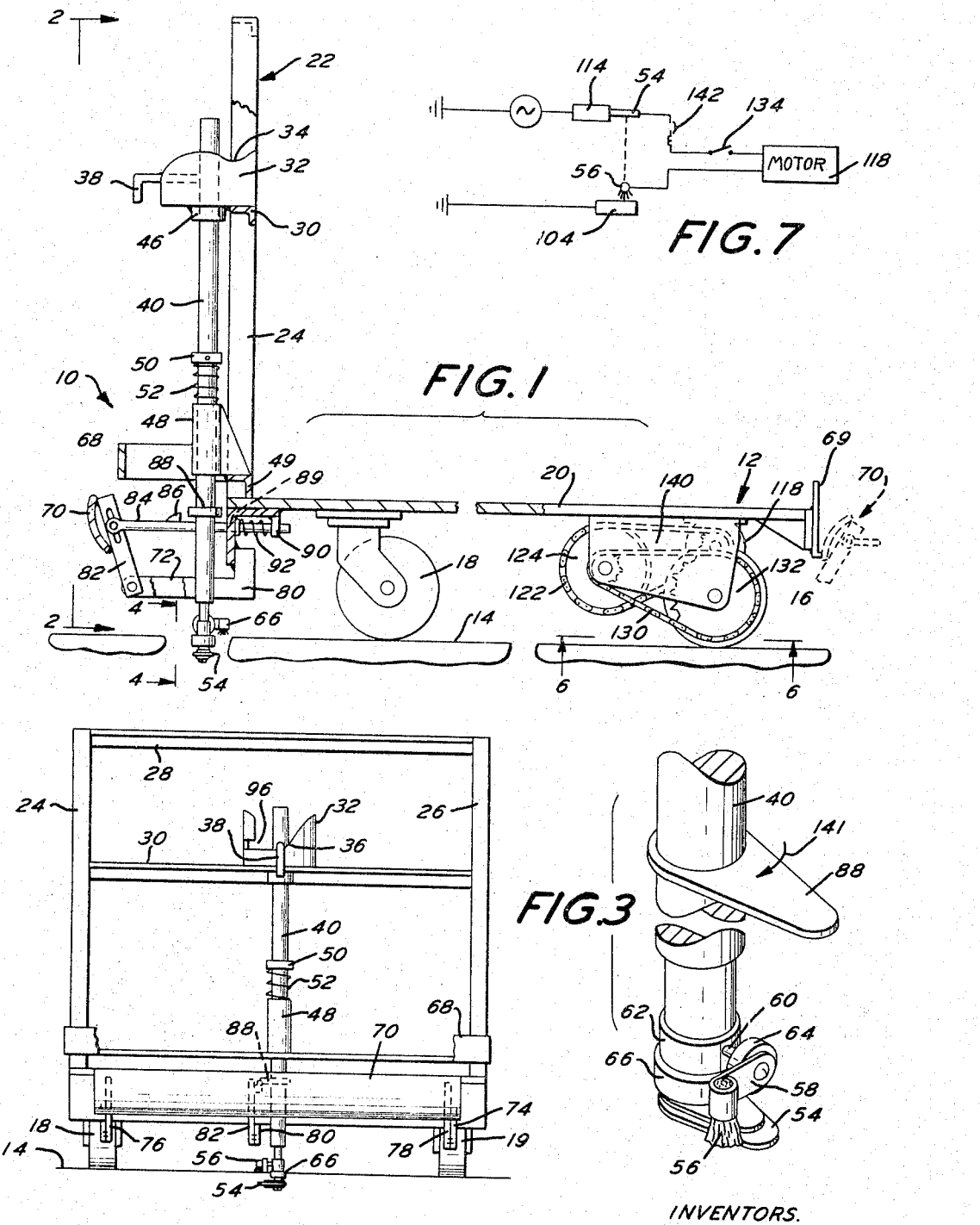

INVENTORS.
LYNN BRADT
CHARLES E. JACOBY
BY
Seidel & Gonda
ATTORNEYS.

United States Patent Office 3,349,718
Patented Oct. 31, 1967

3,349,718
MATERIAL HANDLING APPARATUS
Lynn Bradt, Easton, and Charles E. Jacoby, Bethlehem, Pa., assignors to SI Handling Systems, Incorporated, Easton, Pa., a corporation of Pennsylvania
Filed Mar. 10, 1965, Ser. No. 438,484
12 Claims. (Cl. 104—88)

This invention relates to material handling apparatus. In particular, the present invention is directed to an electrical driverless tow truck system and a vehicle useful therein.

Heretofore, many mechanical tow truck systems have been proposed. For example, see U.S. Patents 3,103,183; 3,094,944 and 3,103,895. The systems disclosed in said patents have operated satisfactorily and are practical for most environments wherein there is a main slot and a plurality of shunt slots which intersect the main slot. The system of the present invention also includes a main slot and a plurality of shunt slots which intersect the main slot.

There are certain environments where a mechanical system is impractical and/or too expensive. The mechanical system may be impractical when the reference surface, such as the floor, containing the main guide slot is not thick enough. Thus, the mechanical system requires a conveyor device or chain below the plane of the tow pin for the length of the main slot. A mechanical system becomes too expensive when the main guide slot is of great length such as one-half mile long with relatively few shunt slots intersecting the main slot, such as about ten shunt slots. While the system of the present invention has characteristics of simplicity, practicability, and low cost, for large and small systems, its novel structural interrelationship makes it reliable. At the same time, the present invention is directed to a system adapted to have many desirable features of a mechanical system. For example, one such desirable feature is the provision of an accumulation bumper. An accumulation bumper, for example, is shown in Patent 3,103,895. An accumulation bumper as per the present invention interrupts the electrical circuit rather than lifting the tow pin as per the last-mentioned patent.

In the electrical driverless tow truck system of the present invention, a pair of electrically isolated rails are provided in a reference surface having a main guide slot adjacent thereto. A driverless vehicle is provided with a tow pin which enters the main guide slot. The tow pin is provided with a pair of electrical contact structures each adapted to mate with one of the rails. One of the rails is grounded and the other rail is connected to a source of current. When the electrical contact structures are mating with their respective rails, an electrical potential is coupled to a motor on the vehicle which in turn drives the vehicle along the main guide slot.

It is an object of the present invention to provide an electrical driverless material handling system wherein vehicles may be dispatched along a main guide slot and selectively shunted along a shunt slot.

It is another object of the present invention to provide a driverless material handling vehicle adapted for use in an electrical material handling system.

It is another object of the present invention to provide an electrical driverless material handling system which is simple, practical and reliable.

It is another object of the present invention to provide a tow truck system and vehicle wherein an electrical motor for driving the vehicle is supported by the vehicle.

Other objects will appear hereinafter.

For the purpose of illustrating the invention, there are shown in the drawings forms which are presently preferred; it being understood, however, that this invention is not limited to the precise arrangements and instrumentalities shown.

FIGURE 1 is a side elevation view of the system and truck of the present invention.

FIGURE 2 is a front elevation view taken along the line 2—2 in FIGURE 1.

FIGURE 3 is a broken perspective view of the lower end of the guide member illustrated in FIGURES 1 and 2.

FIGURE 7 is a schematic wiring diagram.

Figure 4:
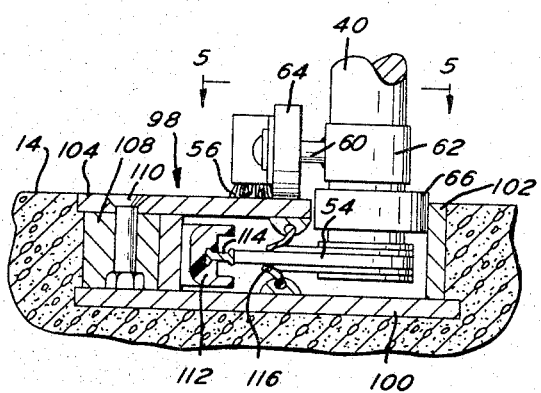
FIGURE 4 is a sectional view taken along the line 4—4 in FIGURE 1.

Referring to the drawing in detail, wherein like numerals indicate like elements, there is shown in FIGURE 1 a material handling system designated generally as 10. The system 10 includes a vehicle designated generally as 12 supported on a reference surface such as a floor 14. The vehicle 12 is supported on the reference surface 14 by a pair of rear wheels 16 (only one is illustrated) and a pair of front wheels 18 and 19.

As illustrated, the vehicle 12 includes a horizontally disposed platform body 20 having an upright portion 22 at its front end. The vehicle 12 may assume a wide variety of configruations depending upon the nature of the products to be transported. If desired, the vehicle 12 may have fork lift apparatus supported thereon, may have side and/or end walls, may have means for heating or cooling materials supported thereby, etc.

As illustrated, the upright portion 22 includes side rails 24 and 26 interconnected by a top crossbar 28 and a middle crossbar 30. A curved guard plate 32 is supported by the bar 30. The plate 32 is provided with a notch 34 on its upper edge which constitutes an inoperative position for the guide member 40 as will be made clear hereinafter. The plate 32 also includes a handle notch 36 constituting an operative position for the guide member 40. As illustrated, the upright guide member 40 is provided with a handle 38 disposed in the operative position defined by the notch 36.

The upright guide member 40 is supported for upward and downward movement by a pair of spaced sleeves 46 and 48. The sleeve 46 is supported by the middle crossbar 30 beneath the guard plate 32. The sleeve 48 is supported by a bottom crossbar 49. A collar 50 is adjustably supported on the guide member 40 by a set screw. A torsion spring 52 has one end connected to the collar 50 and its other end connected to the sleeve 48. The purpose of spring 52 will be made clear hereinafter.

As shown more clearly in FIGURE 3, the guide member 40 is provided adjacent its lowermost end with a first contact structure 54 extending radially outwardly therefrom. Contact structure 54 is electrically isolated from the guide member 40. A second contact structure 56 is provided above and circumferentially offset with respect to the first contact structure 54.

Contact structure 56 may be in the form of a brush supported at one end of a bracket arm 58. Bracket arm 58 is supported at one end of rearwardly outwardly directed pin 60. Pin 60 is supported from collar 62 in a position so as to be directly over the contact structure 54. A contact roller 64 is supported by the pin 60 between sleeve 62 and arm 58.

The contact structure 56 is electrically connected to the guide member 40 so that the body of vehicle 12 is grounded. A double race bearing is provided between the sleeve 62 and the contact structure 54. The outer race of the double race bearing is designated as 66 and the purpose of the same will be made clear hereinafter.

The vehicle 12 is provided with a pushing bumper 68 and a rear bumper 69 shown more clearly in FIGURE 1. The pushing bumper 68 is rigid with respect to the body 20. Vehicle 12 is also provided with a movable accumulation bumper 70. Each of these bumpers are at the front or forward end of the body 20. The bumper 70 is supported by a plurality of forwardly directed mounting brackets 72, 74 and 80 which may contain a bumper limit stop. Links 76, 78 and 82 are pivotably connected at one end to the brackets 72, 74 and 80, respectively. The other ends of the links are fixedly secured to the bumper 70.

As shown more clearly in FIGURES 1 and 2, the link 82 is disposed approximately in the center of the bumper 70. A rod 84 has one end pivotally coupled to the link 82 at an elongated slot in the link 82. Rod 84 has a cam 86 thereon adapted to abut and actuate a cam follower 88. The cam follower 88 projects radially outwardly from and is secured to the guide member 40. The end of rod 84 remote from link 82 extends through guide structure 90. A spring 92 extends between guide structure 90 and a collar on rod 84. Spring 92 biases the bumper 70 to the position illustrated in FIGURE 1. In order to accommodate rotation of the guide member 40 as will be explained in greater detail hereinafter, the guard plate 32 is provided with a slot 96 to accommodate rotary movement of the handle 38.

Figure 5:
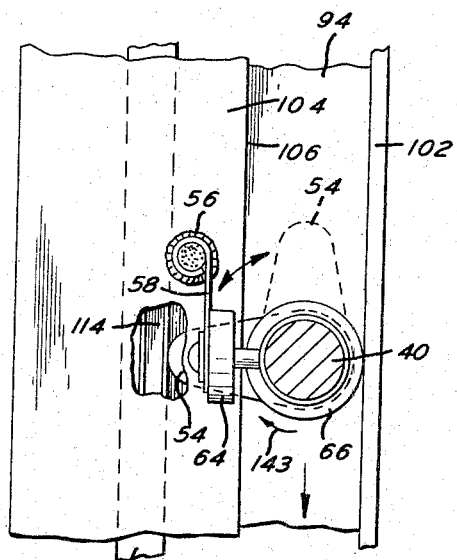
FIGURE 5 is a sectional view taken along the line 5—5 in FIGURE 4.

As shown more clearly in FIGURES 4 and 5, the system 10 includes a track designated generally as 98 which may be mounted in or on the reference surface 14. As illustrated, the track 98 is mounted in the reference surface 14 so as to have its uppermost surface flush therewith. Track 98 includes a bottom plate 100, an upright side plate 102 and a top rail 104. Rail 104 is flush with the reference surface 14 and substantially parallel to the bottom plate 100. Top rail 104 is narrower than bottom plate 100 and thereby terminates in an edge 106 spaced from the side plate 102 by a distance which is slightly greater than the diameter of outer race 66. The space between edge 106 and side plate 102 defines a main slot 94. Main slot 94 is intersected at spaced points therealong by shunt slots as is conventional in the art and illustrated in the above-mentioned patents. Since the provision of shunt slots intersecting the main slot, with or without a power drive along the shunt slots, is so well-known to those skilled in the art it is not deemed necessary to illustrate or further describe the same.

The top rail 104 and the bottom plate 100 are spaced apart by a spacer 108 and interconnected by a bolt 110. The materials for spacer 108 and bolt 110 are not particularly relevant since the top rail 104 may be electrically coupled to the bottom plate 100 without interfering with the nature of the present invention. A bottom rail 114 is supported between the top rail 104 and the bottom plate 100 by electrical insulation 112. Rail 114 is separated from the main slot 94 by a curtain 116. Curtain 116 is preferably a pair of mating halves of electrical insulating material which is also flexible such as strips of polyurethane. One strip of polyurethane may be supported by the bottom plate 100 and the other strip supported on the under surface of the top rail 104.

Figure 6:
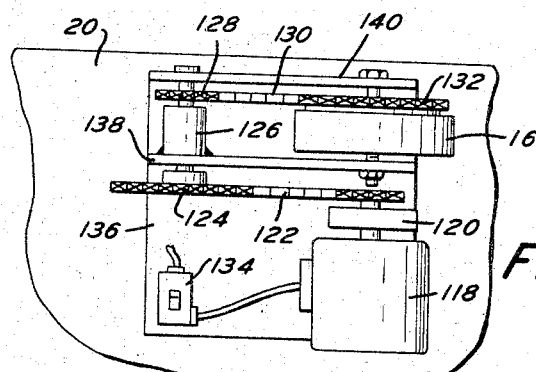
FIGURE 6 is a view taken along the line 6—6 in FIGURE 1.

As shown more clearly in FIGURE 6, the under surface of the body 20 supports a motor 118. The output of the motor 118 is connected to a clutch 120 which is of the centrifugal type and commercially available. The output of the clutch 120 is provided with a sprocket in meshing engagement with a chain 122. Chain 122 extends around a larger sprocket 124. Sprocket 124 is supported by one end of a shaft extending through a bearing 126. The other end of the shaft supports a sprocket 128.

Sprocket 128 is in meshing engagement with a chain 130 which also extends around a sprocket 132. Sprocket 132 is connected to the shaft supporting the rear wheel 16. The rotor of the motor 118 is not connected to the wheel 16 unless the motor 118 is operating. Hence, the vehicle 12 may be manually pushed without working against the rotor of the motor 118. This relationship results from the nature of the centrifugal clutch 120.

A manual on-off switch 134 is provided for the motor 118. Elements 118–134 are mounted as a subassembly on a baseplate 136. Baseplate 136 is adapted to be removably connected to the underside of body 20 by bolts or the like. In this manner, any malfunction of these elements can be more easily corrected by removing the entire subassembly and replacing the same with a new subassembly. Thus, vehicles will remain out of service for a minimum period of time. The baseplate 136 is provided with spaced parallel bracket plates 138 and 140 which support the shafts for wheel 16 and the sprockets 128 and 124.

As shown more clearly in FIGURE 7, the bottom rail 114 is connected to a source of alternating current, such as 110 volts, which in turn is grounded. The top rail 104 is also grounded. The contact structures 54 and 56 are coupled to the rails 114 and 104 respectively. Electrical conductors, such as wires, extend between the contact structures 54 and 56 and the motor 118. One of the conductors is provided with an overload protection device such as circuit breaker 142.

The vehicle 10 may be provided with any conventional type of shunt slot selecting apparatus to cause the vehicle 12 to be automatically shunted from a main slot to movement after a shunt slot. For example, the vehicle 12 may be provided with trip rods, such as rods 26–36 in Patent 3,103,183, with the same supported between the bumper 70 and guide member 40 in FIGURE 1 of the present invention. A switching device compatible with the trip rods will also be provided at the intersection of the shunt and main slots, such as the switching device illustrated in FIGURES 3 and 4 of the last-mentioned patent. It will be appreciated that such a switching system is illustrative of a variety of systems which may be utilized to selectively cause the vehicle 12 to be shunted from the main slot along the selected shunt slot.

The operation of the system 10 is as follows:

It will be assumed that the vehicle 12 is loaded with articles or it is otherwise desired to dispatch the vehicle 12 to a particular area adjacent the selected shunt slot. Depending upon the particular type of switching system utilized, adjustments will be made on the vehicle 12 as dictated by the system. Thus, one or more of the trip rods, assuming that trip rods are utilized, will be positioned to effect a switching action at the desired shunt slot. Thereafter, the vehicle 12 may be manually pushed along the reference surface 14 until it is positioned over the track 98. The handle 38 will then be manipulated to place the same in the position illustrated in FIGURE 1 so that the lower end of the guide member 40 extends into the main slot 94. When the lower end of the guide member 40 is entering the main slot 94, the contact structure 54 is in the phantom position illustrated in FIGURE 5. As soon as the handle 38 is released, the torsion spring 52 will rotate the member 40 and thereby rotate the contact structures 54 and 56 to the position shown in solid lines in FIGURE 5. Assuming that switch 134 is closed, the completion of a circuit to the motor 118 will automatically start the motor and drive the rear wheel 16 thereby propelling the vehicle 12 along the main slot 94. The outer race 66 will contact one or the other surface defining the main slot 94 and rotate about the longitudinal axis of member 40.

The above-mentioned rotation of the contact member 54 causes the same to separate the curtain halves so that it may be coupled to the bottom rail 114 by contact therewith. The curtain halves are preferably a plurality of short lengths, such as three inches or less. Hence, the curtain halves automatically resume their upright mating position as soon as the contact structure 54 passes therealong. The curtain 116 provides a barrier to prevent dirt, water, and other foreign matter from contacting the rail 114.

The vehicle 12, as thusly dispatched, will automatically be switched at the intersection of the selected shunt slot and the main slot 94. If the shunt slot is not provided with motive power such as electrical rails described above, or a mechanical conveyor chain having pusher dogs thereon, the vehicle 12 will enter the shunt slot and move therealong under its momentum built up during movement along the main slot 94.

The pusher bumper 68 is adapted to engage a rear bumper, corresponding to bumper 69, on a preceding vehicle and push the same. In the event that the vehicle 12 is confronted with an obstruction in its path, such as another vehicle, while moving along the main slot, the accumulation bumper 70 will contact a rear bumper corresponding to bumper 69 and will be rotated in a clockwise direction in FIGURE 1 until the cam 86 contacts the cam folower 88 and rotaes the guide member 40. Such rotation of the guide member 40 will be in the direction of arrow 141 in FIGURE 3 and arrow 143 in FIGURE 5. Such rotation in the direction of arrows 141 and 143 will interrupt the electrical circuit to the motor 18 by breaking contact between rail 114 and the contact structure 54. To interrupt the circuit, the rotation of the guide member 40 need only be through a small angle, such as ten degrees. However, as a precautionary measure the elements are structurally interrelated so that rotation will be through an angle of approximately 45 degrees. As shown at the righthand end of FIGURE 1, rear bumper 69 is designed to retain the front accumulation bumper in an upper position. As soon as the obstruction is removed, spring 92 causes the bumper 70 to resume the position illustrated in FIGURE 1 and torsion spring 52 causes the contact structure 54 and 56 to resume their solid line positions in FIGURE 5. Thereafter, the vehicle 12 will continue on its course.

Figure 8:
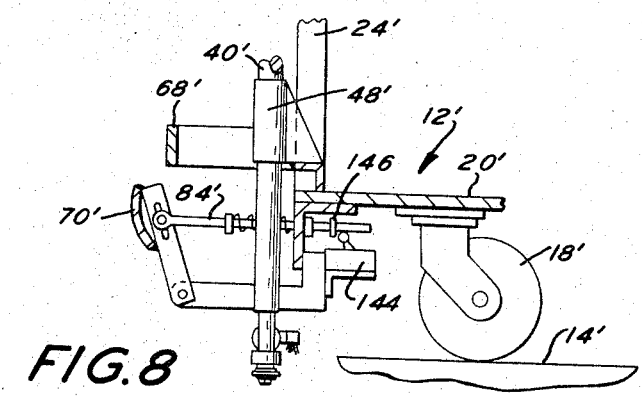
FIGURE 8 is a partial side elevation view of another embodiment of the present invention.
Figure 9:
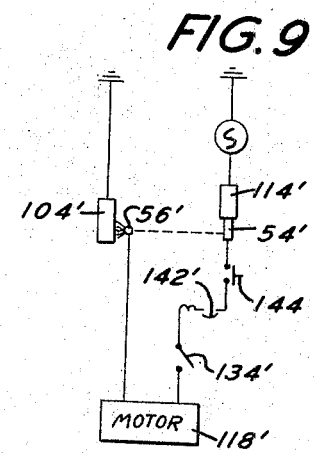
FIGURE 9 is a schematic wiring diagram in connection with the embodiment of FIGURE 8.

In FIGURES 8 and 9, there is illustrated another vehicle designated generally as 12'. Vehicle 12' is identical with vehicle 12 except as will be described hereinafter. Hence corresponding elements on vehicle 12' are provided with corresponding primed numerals. In vehicle 12', the guide member 40' is provided with a torsion spring corresponding to the spring 52. Vehicle 12' does not include a cam or cam follower for causing an interruption of the electrical circuit in response to movement of bumper 70'. Instead, a switch 144 having a contact biased to a closed position is supported beneath the body 20'. An adjustable actuator 146 is provided on the rod 84'. Movement of the accumulation bumper 70' in a clockwise direction due to contact with an obstruction causes the actuator 146 to open switch 144 thereby interrupting the electrical circuit to the motor 118'. The vehicle 12' is usable in the system 10 in the same manner as vehicle 12.

Thus, it will be seen that the present invention is simple, practical and reliable especially for systems having a long main slot wherein the cost of providing a mechanical propulsion device such as a chain having pusher dogs becomes prohibitive. As will be apparent from FIGURE 4, the depth of the track 98 in the reference surface 14 is very small, on the order of one to two inches. Hence, the system is practical for use in or on existing floors such as the second or third floor in an existing building, which floors are of insufficient thickness to accommodate a mechanical system. In addition, the system of the present invention is quieter and is more economical since the motor 18 need only be large enough to propel the vehicle 12 whereas the motor utilized in the mechanical system must be large enough to pull the conveyor chain and all of the vehicles coupled thereto.

The system of the present invention is equally adaptable for use with an overhead rail and guide slot. The wheel coupled to the motor for propelling the vehicle may be a fifth wheel if desired. In the above described systems, it is preferred to utilize a single phase motor operable in a 110 volt system. If desired, a three phase motor coupled to three rails may be utilized.

The present invention may be embodied in other specific forms without departing from the spirit or essential attributes thereof and, accordingly, reference should be made to the appended claims, rather than to the foregoing specification as indicating the scope of the invention.

It is claimed:

1. An electrical driverless material handling system comprising a reference surface having a guide slot, a pair of spaced electrical rails adjacent to and extending along said slot, driverless vehicle having a guide member centrally supported by said vehicle, said guide member having a lower end portion partially extending into said slot, said member having at one end a pair of electrically isolated contact structures each adapted to be electrically coupled to one of said rails, said member cooperating with said slot to guide the vehicle for movement along the slot, one of said contact structures being below and projecting to one side of the slot, said one contact structure being mounted for movement to a position so that it is movable vertically through the slot while supported by said member, said vehicle having wheels, a motor on said vehicle, said motor being coupled to at least one of said wheels for driving the same to propel the vehicle along the slot, and conductors on said vehicle coupling said motor in series with said contact structures.

2. A system in accordance with claim 1 including means defining a curtain between said slot and one of said rails below said slot, said curtain being constructed and arranged to permit one of said contact structures to be coupled to said one rail, and said curtain being made from an electrical insulating material.

3. A system in accordance with claim 1 wherein said rails are disposed one above the other and electrically insulated from one another, the uppermost of said rails being grounded and having a portion defining a side of said slot.

4. A system in accordance with claim 1 wherein said guide member is mounted for rotation about its longitudinal axis, and said contact structures being secured to said guide member for rotation therewith, said contact structures having a rotary position wherein they are out of contact with their respective rails, and means for moving the contact structures to a position wherein they are coupled to their respective rails.

5. A system in accordance with claim 1 including an accumulation bumper extending transversely across the front of the vehicle, said bumper being movably supported, and means on said vehicle responsive to the movement of said bumper for interrupting the electrical circuit between said motor and said rails.

6. A material handling vehicle comprising a portable, driverless body having an upright portion on the front end of the body, an upright guide member supported by said upright portion, an electrical circuit on said body, said circuit including a pair of radially outwardly projecting contact structures adjacent one end of said member, said member and contact structures being rotatable as a unit about the longitudinal axis of said member, spring means for rotating said member to a predetermined position, and said circuit including a motor on said body electrically coupled to said contact structures.

7. A vehicle in accordance with claim 6 including a bumper movably supported on the front end of the body forwardly of the member, and movable means on said body responsive to movement of said bumper for interrupting said circuit.

8. A vehicle in accordance with claim 7 wherein said last-mentioned means is a switch.

9. A vehicle in accordance with claim 7 wherein said last-mentioned means is one of said contact structures.

10. A vehicle in accordance with claim 6 wherein said circuit includes a motor coupled to one wheel on said body, means supporting said one wheel and motor and the coupling therebetween for removal as a unit.

11. A material handling vehicle comprising a driverless body mounted on wheels, an upright portion on the front end of the body, an upright guide member supported by said portion and projecting to a level below the level of the wheels so that the guide member may extend into a guide slot and guide movement of the vehicle therealong, a handle on the upper end of said member for manually raising and lowering said member, motor means on said vehicle for propelling said vehicle, a pair of contacts at the lower end of said member projecting radially outwardly from only a portion of the periphery of said member with respect to the longitudinal axis of said member, said contacts being electrically coupled to said motor means, said contact being one above the other, a movable bumper on said body adjacent said upright portion, and means interconnecting said bumper with said motor means so that contact between an abutment and said bumper causes the bumper to render the motor means inactive.

12. A system in accordance with claim 1 including means defining a vertical curtain below and to one side of the slot, said curtain having a horizontally dispased split, one of said rails being disposed below the slot and positioned so that the curtain is between said one rail and the slot, said one contact structure being supported by said member at an elevation below the slot so that it may project through the split in the curtain and contact said one rail, said curtain being made from an electrically insulating material.

References Cited

UNITED STATES PATENTS

| | | | |
|---|---|---|---|
| 900,958 | 10/1908 | Richardson | 191—31 |
| 1,124,273 | 1/1915 | Bernheim | 104—148 X |
| 1,410,440 | 3/1922 | Woroniecki | 191—31 X |
| 1,886,484 | 11/1932 | Kline | 104—149 |
| 2,631,853 | 3/1953 | Haynes et al. | 104—149 X |
| 2,898,868 | 8/1959 | Simon | 104—148 X |
| 2,903,526 | 9/1959 | Mattox | 104—149 X |
| 3,074,354 | 1/1963 | Wakkila | 104—147 X |
| 3,103,895 | 9/1963 | Bradt et al. | 104—178 X |
| 3,119,347 | 1/1964 | Dehne | 104—178 X |
| 3,206,122 | 9/1965 | Frisbie et al. | 104—60 X |
| 3,207,084 | 9/1965 | York | 104—93 X |
| 3,262,397 | 7/1966 | Bradt | 104—172 X |

FOREIGN PATENTS 398,602   9/1933   Great Britain.

ARTHUR L. LA POINT, *Primary Examiner.*

S. B. GREEN, D. F. WORTH, *Assistant Examiners.*